Sept. 10, 1963        S. G. CALLERFELT        3,103,365
OIL-CONTROL PISTON RINGS
Filed Nov. 6, 1959

INVENTOR:
SVEN GUNNAR CALLERFELT
By: Darby & Darby
HIS ATTORNEYS.

United States Patent Office 3,103,365
Patented Sept. 10, 1963

3,103,365
OIL-CONTROL PISTON RINGS
Sven Gunnar Callerfelt, Beckrannarbacken 3,
Stockholm, Sweden
Filed Nov. 6, 1959, Ser. No. 851,378
1 Claim. (Cl. 277—140)

The present invention relates to expanding, non-bottoming compound oil-control piston rings for engine pistons, pump pistons and the like, comprising oil-scraping laminated rings or rails and an annular expander separating said rails and actuating them in an expanding direction with spring force, said annular expander being formed with arcuate spring elements connecting space members separating the rails and transmitting spring force thereto in an expanding direction, said spring force being produced by said arcuate spring elements expanding in directions tangential to the expander and urging the latter to expand.

In oil-control rings of the kind indicated above the best possible freedom of movement of the annular expander in the expanding and contracting direction is desirable in order that it shall not be necessary to make the spring elements so stiff and with such a short spring action that a certain wear of the cylinder wall or the rails permitted per se will produce a considerably reduced contact pressure between the rail and the cylinder wall. In known constructions the initial pressure has had to be chosen relatively great in order not to decrease too quickly below an acceptable minimum contact pressure, causing increased wear and detrimental heating. Thus, in a known construction, the spring elements bear directly against the rails giving rise to additional frictions which in turn make it necessary to increase the spring force with the disadvantageous consequences indicated above. In another known construction the same drawbacks occur, since the rails rest on those parts of the expander which are displaced at the expansion or contraction of the same in a radially opposite direction to said expansion or contraction.

It is an object of the present invention to provide an improved oil-control ring in which the spring elements are of lesser dimension axially of the piston ring than the spacers separating the rails, and are so designed and disposed that they extend freely between the rails without contacting the inner faces thereof.

By this structure the abovementioned drawbacks of the known constructions are eliminated, and an oil control-ring is obtained which has great freedom of expansion and contraction and is subjected to small friction forces between the annular expander and the rails. By that reason it can be made with rather thin spring elements which therefore may have a rather long course of spring action. The difference between the initial ring pressure against the cylinder wall and the pressure when the cylinder diameter has been increased by wear, will be moderate, and consequently the ring can be manufactured to give optimal performance from the outset, and will not deteriorate to any appreciable extent during its continued use. Due to the reduced friction of the expander against the rails the risk of the parts sticking together, and of the ring getting stuck in the piston ring groove is diminished.

An embodiment of the invention will be hereinafter described by way of example with reference to the accompanying drawing, in which.

Figure 1:
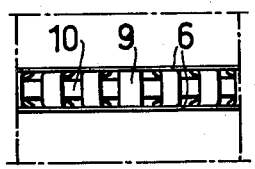
FIG. 1 is a lateral elevation of a portion of an oil-control ring.
Figure 2:
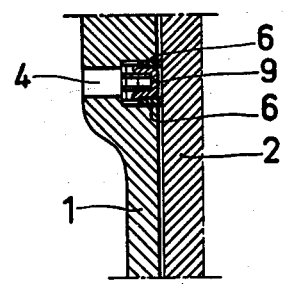
FIG. 2 is an axial section through part of a piston with an oil-control ring.
Figure 3:
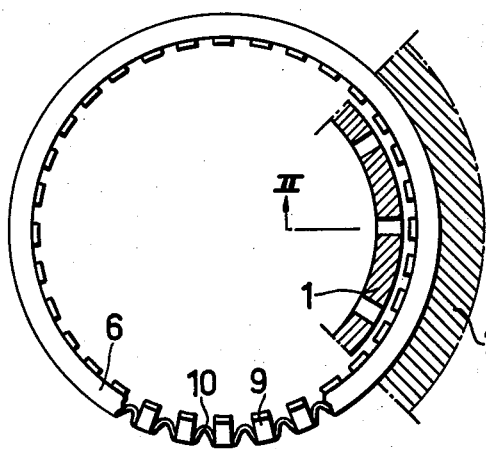
FIG. 3 is a plan view of the ring.

The U-shaped spacers 9 which are arranged in great number around the periphery of the oil-control ring, keep the rails 6 apart in the annular piston ring groove of the piston 1. The shanks of the U-profile are flared at the ends so as to constitute contact surfaces for the rails. The spacers 9 are mutually connected by means of integral arcuate spring elements 10. When mounting the piston 1 in the cylinder 2 the oil-control ring is compressed, and the spring elements 10 are pre-stressed. As a result they exert an expanding force upon the rails 6 around the whole circumference of the latter. Oil scraped off from the cylinder wall 2 passes the spring elements 10 and through the piston apertures to the crankcase or the like. The spring force of the ring composed of the elements 9 and 10 may easily be given the required size by suitable dimensioning of the width and curvature of the spring elements. The resilient deformation of the elements is great due to the material distribution in the elastically deformed material layers being advantageous.

By the said reason, the diameter of the unmounted ring 9, 10 may differ considerably from the corresponding cylinder diameter without detrimental effects upon the spring force. Rings 9, 10 of the same nominal diameter can be used for a range of adjacent cylinder diameters, e.g. for different standardized oversizes. The number of dimensions which need be kept in stock therefore may be reduced.

The spring force exerted by the spring elements 10 is maintained even if the rails 6, and the cylinder walls 2, respectively, have become considerably worn.

Furthermore, the risk of the drain openings 4 in the piston wall for the oil becoming clogged due to overheating with resulting seizing is eliminated thanks to the fact that the spring force may be kept at such a small size that detrimental friction heat is not produced between the rails and the cylinder wall.

Figure 4:
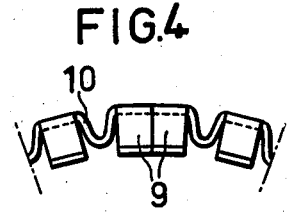
FIGS. 4 and 5 are detail views of the annular expander.
Figure 5:
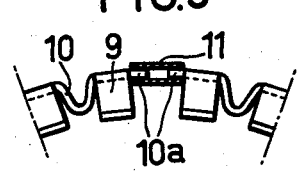

FIGS. 4 and 5 illustrate how the free ends of the expander ring 9, 10 may be joined together. In FIG. 4 the abutting ends of two spacers 9 are illustrated. Their relative position is fixed automatically when the ring 9, 10 is mounted in the piston ring groove together with the rails 6. FIG. 5 shows a sleeve element 11 disposed between two spacers 9. In the sleeve element there are inserted two studs 10a, one from each end of the sleeve, which consists of stumped-off straightened pieces of spring elements 10. The diameter of the ring 9, 10 can be varied within certain limits by using sleeve elements 11 of different lengths. Instead of a sleeve element some other known, suitable joining element may be used.

Figure 6:
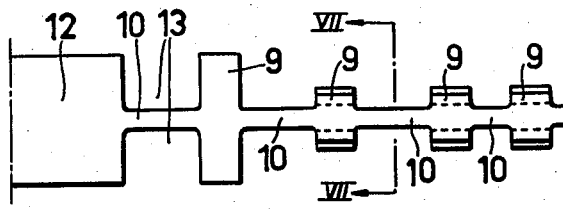
FIGS. 6–8 illustrate a step in the manufacture of the annular member in FIGS. 1–5.
Figure 7:
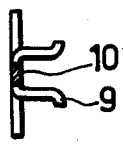
Figure 8:
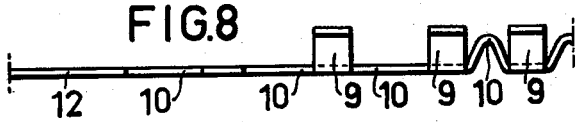

FIGS. 6 to 8 show a continuous method of manufacturing blanks for rings 9, 10. For example, the ring blanks may be punched from spring steel bands. At a first station in the die the recesses 13 are punched. By punching four such recesses a flat spring element 10 as well as a flat blank for a spacer 9 is obtained. At the second die station the spacer 9 is bent to U-profile, and at the third die station the spring element 10 is bent. By giving the spring elements 10 their proper bent shape the expander ring 9, 10 obtains its circular shape and its correct diameter simultaneously with the bending. Between the operations the spring steel band 12 is fed a distance equal to the total length of a flattened-out spring element 10 and a spacer 9.

What I claim is:

An expanding non-bottoming compound oil-control ring for engine pistons, pump pistons and the like, comprising in combination oil scraping rails and an annular expander separating said rails and actuating them in an expanding direction with spring force, said annular expander being formed with spring elements in the form of arcs with their convex sides facing the center of the expander, said spring elements connecting U-shaped spacing members separating the rails, said spacing members being formed with substantially flat faces engaging said rails over a major portion of the radial extent of the latter and transmitting spring forces thereto in an expanding direction, said arcuate spring elements having lesser radial extent than said spacing members and producing spring force by expanding in directions tangential to the expander and urging the latter to expand, said spring elements connecting said spacing members on the center line thereof and being of less extent axially of the piston than the spacing members separating the rails thereby extending freely between the rails without contacting the inner faces thereof and an exchangeable spacing sleeve fitted around the free ends of the expander to space and fix said ends laterally relative to one another.

References Cited in the file of this patent

UNITED STATES PATENTS

| | | |
|---|---|---|
| 1,399,841 | Berels et al. | Dec. 13, 1921 |
| 1,811,012 | Hodge | June 23, 1931 |
| 2,438,163 | Haling | Mar. 23, 1948 |
| 2,535,597 | Phillips | Dec. 26, 1950 |
| 2,639,205 | Wilkening et al. | May 19, 1953 |
| 2,775,495 | Olson | Dec. 25, 1956 |
| 2,893,798 | Olson | July 7, 1959 |